(12) United States Patent
Rouleau et al.

(10) Patent No.: US 8,201,475 B2
(45) Date of Patent: Jun. 19, 2012

(54) STEERING COLUMN WITH RAKE AND TELESCOPE ADJUSTMENT

(75) Inventors: James E. Rouleau, Burt, MI (US); Farid S. Alshomaly, Flushing, MI (US); Michael R. Marzi, Montrose, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 252 days.

(21) Appl. No.: 12/428,841

(22) Filed: Apr. 23, 2009

(65) Prior Publication Data

US 2009/0218800 A1 Sep. 3, 2009

Related U.S. Application Data

(62) Division of application No. 11/109,420, filed on Apr. 19, 2005, now abandoned.

(51) Int. Cl.
*B62D 1/16* (2006.01)
*B62D 1/18* (2006.01)
(52) U.S. Cl. .............................. 74/495; 74/493; 280/775
(58) Field of Classification Search ................... 74/493, 74/494, 495; 280/775; 292/197, 201
See application file for complete search history.

(56) References Cited

U.S. PATENT DOCUMENTS

| | | | |
|---|---|---|---|
| 2,153,998 A | 4/1939 | Verderber et al. | |
| 3,711,139 A | 1/1973 | Polk, Jr. | |
| 4,244,237 A | 1/1981 | Sprunger | |
| 4,461,501 A * | 7/1984 | Dumbser | 292/201 |
| 4,732,050 A | 3/1988 | Vollmer | |
| 5,301,567 A | 4/1994 | Snell et al. | |
| 5,562,306 A | 10/1996 | Rispeter | |
| 5,722,299 A | 3/1998 | Yamamoto et al. | |
| 5,829,311 A | 11/1998 | Roberson | |
| 5,931,501 A | 8/1999 | Baumann et al. | |
| 6,139,057 A | 10/2000 | Olgren et al. | |
| 6,237,438 B1 | 5/2001 | Rhouma et al. | |
| 6,314,829 B1 | 11/2001 | Appleyard | |
| 6,419,269 B1 | 7/2002 | Manwaring et al. | |

(Continued)

FOREIGN PATENT DOCUMENTS

EP 0972694 A1 1/2000

(Continued)

OTHER PUBLICATIONS

European Search Report dated Dec. 10, 2010 for European Application No. 06075813.3-2425/1714849.

(Continued)

*Primary Examiner* — Justin Krause
(74) *Attorney, Agent, or Firm* — Cantor Colburn LLP

(57) ABSTRACT

A steering column assembly for a motor vehicle is adjustable in both rake and telescope directions and then locked in a convenient setting by a driver. The locking mechanism for the telescope and rake adjust is motor actuated in response to activation of a toggle switch. The motor can be proximate or remote from the locking mechanism and the steering column assembly. A transmission operates on a rotating cam principal which alternately cycles a clamp of the locking mechanism between locked and unlocked conditions. A drive shaft extends between the motor and the locking mechanism and can be either rigid or flexible. Locking the steering column assembly in an adjusted position can be accomplished either by compressing a capsule bracket against a compression bracket, or via interlocking engagement of pawls with corresponding teeth in respective slots in the capsule and compression brackets.

25 Claims, 8 Drawing Sheets

U.S. PATENT DOCUMENTS

| | | |
|---|---|---|
| 6,616,185 B2 | 9/2003 | Manwaring et al. |
| 6,659,504 B2 | 12/2003 | Riefe et al. |
| 6,761,376 B2 | 7/2004 | Riefe et al. |
| 6,792,824 B2 | 9/2004 | Jolley et al. |
| 6,830,267 B2 | 12/2004 | Budaker et al. |
| 6,886,859 B2 | 5/2005 | Braun et al. |
| 7,055,860 B2 | 6/2006 | Armstrong et al. |
| 7,178,422 B2 | 2/2007 | Armstrong et al. |
| 7,533,594 B2 | 5/2009 | Menjak et al. |
| 7,574,941 B2 | 8/2009 | Manwaring et al. |
| 2001/0042420 A1 | 11/2001 | Danielsson |
| 2003/0103805 A1 | 6/2003 | Braun et al. |
| 2004/0000779 A1* | 1/2004 | Armstrong et al. ........... 280/775 |
| 2005/0016315 A1 | 1/2005 | Breuss et al. |
| 2005/0092124 A1 | 5/2005 | Gaertner et al. |
| 2006/0021460 A1 | 2/2006 | Schulz |
| 2006/0230863 A1 | 10/2006 | Rouleau et al. |
| 2007/0170711 A1 | 7/2007 | Bechtel et al. |

FOREIGN PATENT DOCUMENTS

| | | |
|---|---|---|
| EP | 1070652 A2 | 1/2001 |
| EP | 1375296 A1 | 1/2004 |
| EP | 1612121 A1 | 1/2006 |
| GB | 2327257 | 1/1999 |
| GB | 2350329 | 11/2000 |
| JP | 03227754 | 10/1991 |

OTHER PUBLICATIONS

Article entitled: "Five Hundred and Seven Mechanical Movements", by Henry T. Brown, pp. 32-33, originally published in 1868 by the Astragal Press, 5 Cold Hill Road, Suite #12, Mendham, New Jersey 07945-0239.

European Search Report and Office Action dated Dec. 18, 2009 for European Application No. 09158470.6.

* cited by examiner

STEERING COLUMN WITH RAKE AND TELESCOPE ADJUSTMENT

CROSS-REFERENCE TO RELATED APPLICATION

This application is a division of U.S. patent application Ser. No. 11/109,420 filed Apr. 19, 2005 now abandoned.

FIELD OF THE INVENTION

This invention relates to an assembly and method for adjusting the rake angle and telescope position of a steering column assembly for a motor vehicle, and more particularly toward an improved clamping mechanism which can be operated by a remotely controlled electric motor.

BACKGROUND OF THE INVENTION

Steering columns for motor vehicles are often designed for adjustable positioning of the steering wheel for improved driver comfort. Commonly, such steering columns can be provided with an adjustable rake, which allows angular adjustment of the steering wheel in up and down directions. Also, the steering column may be provided with a telescoping, or telescope adjustment which allows the steering wheel to be moved closer to or farther away from the driver.

To accomplish the rake and telescope adjustments, the steering column is typically provided with a compression bracket which is moveably carried in a stationary capsule bracket which is fixed relative to the vehicle. Thus, when the steering column is adjusted for rake, the compression bracket moves angularly up and down relative to the stationary capsule bracket. However, when the steering wheel is adjusted for reach, i.e. telescoping movement, the compression bracket typically remains stationary along with the capsule bracket while other components of the steering column assembly accomplish the telescoping movement. A locking mechanism is provided between the capsule and compression brackets to selectively lock them together in an adjusted position. When the locking mechanism is in an unlocked condition, the rake and telescope of the steering column can be adjusted. An operator selectively actuates either a manual, pneumatic, hydraulic or electromotive system to cycle the locking mechanism between the locked and unlocked conditions.

In the case of locking mechanisms which are actuated by electromotive devices, such as an electric motor, it has been the case that the motor must be located proximate to the locking mechanism and capable of reversing directions so that the locking mechanism can be cycled between its locked and unlocked conditions. However, these two aspects present certain design difficulties. For instance, locating the electric motor near the locking mechanism usually results in reduced design flexibility to the engineer. Providing a motor which can reverse directions has frequently resulted in the use of linear motors which, in solenoid type fashion, stroke back and forth when energized.

There exists a need for an improved locking mechanism for an adjustable steering column assembly which overcomes the disadvantages and design restrictions characteristic of the prior art.

SUMMARY OF THE INVENTION AND ADVANTAGES

The invention comprises a steering column assembly for a motor vehicle having an adjustable rake and reach. The assembly includes a column sleeve, a capsule bracket for fixed mounting relative to the vehicle, and a compression bracket joined to the sleeve and moveably carried upon the capsule bracket for allowing arcuate and axial motion of the sleeve relative to the vehicle. A locking mechanism having a rotary input and operatively disposed between the capsule bracket and the compression bracket is provided for linear reversing travel between an unlocked condition in which the arcuate and axial position of the sleeve is adjustable, and a locked condition in which the sleeve is retained in an adjusted position. A motor is provided having a rotary output. A drive shaft is rotatably supported between a first end operatively connected to the rotary output of the motor, and the second end operatively connected to the rotary input of the locking mechanism for transmitting rotary motion from the motor to the locking mechanism. A transmission operatively engages the rotary input on the locking mechanism for converting rotary movement in a continuous angular direction from the drive shaft into reciprocating linear movement so that the locking mechanism is actuated from locked condition to the unlocked condition and back to the locked condition without reversing the angular direction of the rotary output from the motor.

According to another aspect of the invention, a locking assembly for an adjustable rake and telescope steering column is provided. The locking assembly comprises a rotary input, a clamp responsive to reciprocating linear inputs for moving between locked and unlocked conditions, and a motor having a rotary output. A drive shaft is rotatably supported between a first end operatively connected to the rotary output of the motor and a second end operatively connected to the rotary input for transmitting rotary motion therebetween. A transmission is disposed between the rotary input and the clamp for converting rotary movement in a continuous angular direction from the rotary input into reciprocating linear movement whereby the clamp is actuated from the locked condition to the unlocked condition and back to the locked condition again without reversing the angular direction of the rotary output.

According to a still further aspect of the invention, a method for adjusting the rake and telescope of a steering column assembly for a motor vehicle is provided. The method comprises the steps of affixing a compression bracket to the steering column, supporting the compression bracket upon a capsule bracket to allow arcuate and axial motion of the steering column relative to the vehicle, and shuttling a locking mechanism between an unlocked condition in which the compression bracket is moveable relative to the capsule bracket, and a locked condition in which the compression bracket is fixed relative to the capsule bracket, and back to the unlocked condition again. The step of shuttling the locking mechanism includes the step of rotating a motor output in a non-reversing angular direction.

Accordingly, the subject invention overcomes the disadvantages inherent in the prior art by providing an assembly capable of locking a steering column in an adjusted rake and telescope position using a motor having a non-reversing rotary output. Thus, the locking mechanism can cycle between its locked and unlocked conditions without reversing the motor. This design construction provides increased design flexibility since more reasonably priced and equipped motors can be used to actuate the system, and since the motor can be located either proximate to or remote from the locking mechanism.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
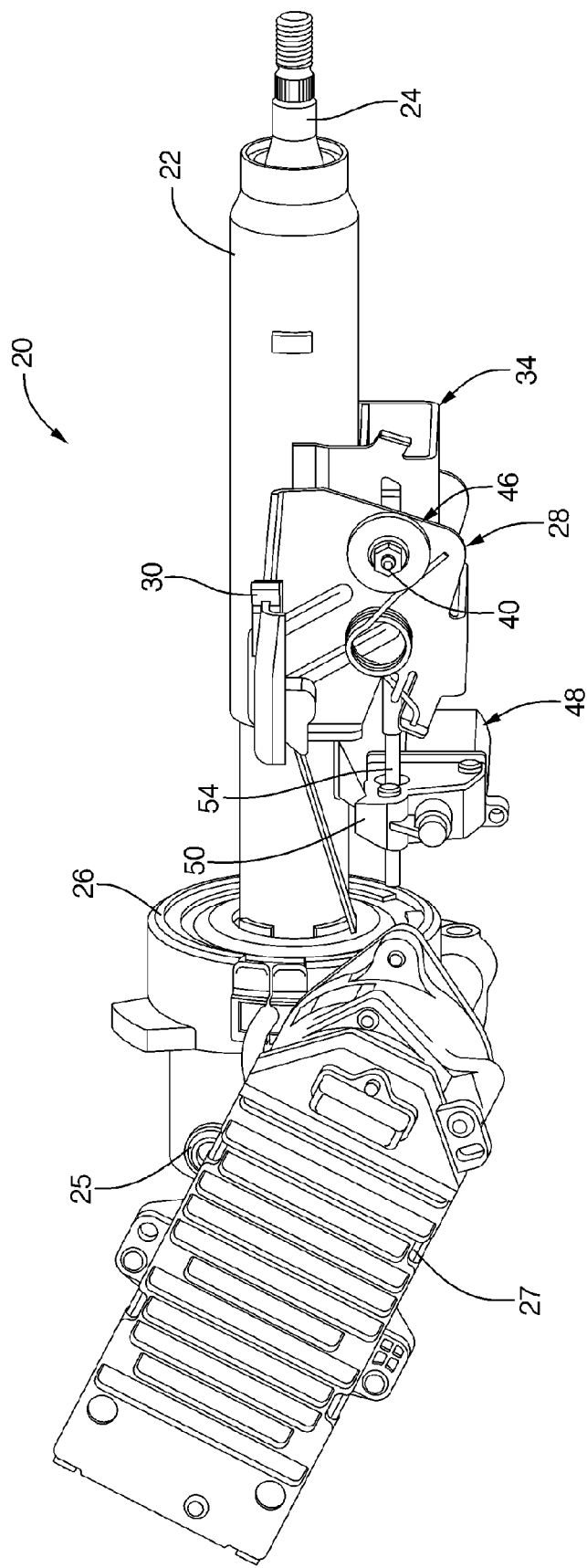
FIG. 1 is a perspective view of a steering column assembly according to the subject invention.

Referring to the Figures, wherein like numerals indicate like or corresponding parts throughout several views, a steering column assembly according to the subject invention is generally shown at 20 in FIG. 1. The steering column assembly 20 is of the type commonly used in motor vehicles which includes a steering wheel (not shown) which can be adjusted by the driver for a rake, i.e. up and down, and for reach, i.e., telescoping movement in and out. The assembly 20 includes the typical column sleeve 22 which carries an inner rotating shaft 24 for transmitting movements from the steering wheel to the front wheels. As shown in FIG. 1, the inner shaft 24 may be coupled to an electronic control mechanism or assist, generally indicated at 26. Alternatively, the inner shaft 24 can extend to a hydraulic or mechanical steering mechanism such as is common in the art. The electronic assist 26 may be pivoted at 25 to establish a rake adjustment for the assembly 20. An electronic power steering controller 27 is operatively coupled to the electronic assist 26.

Figure 2:
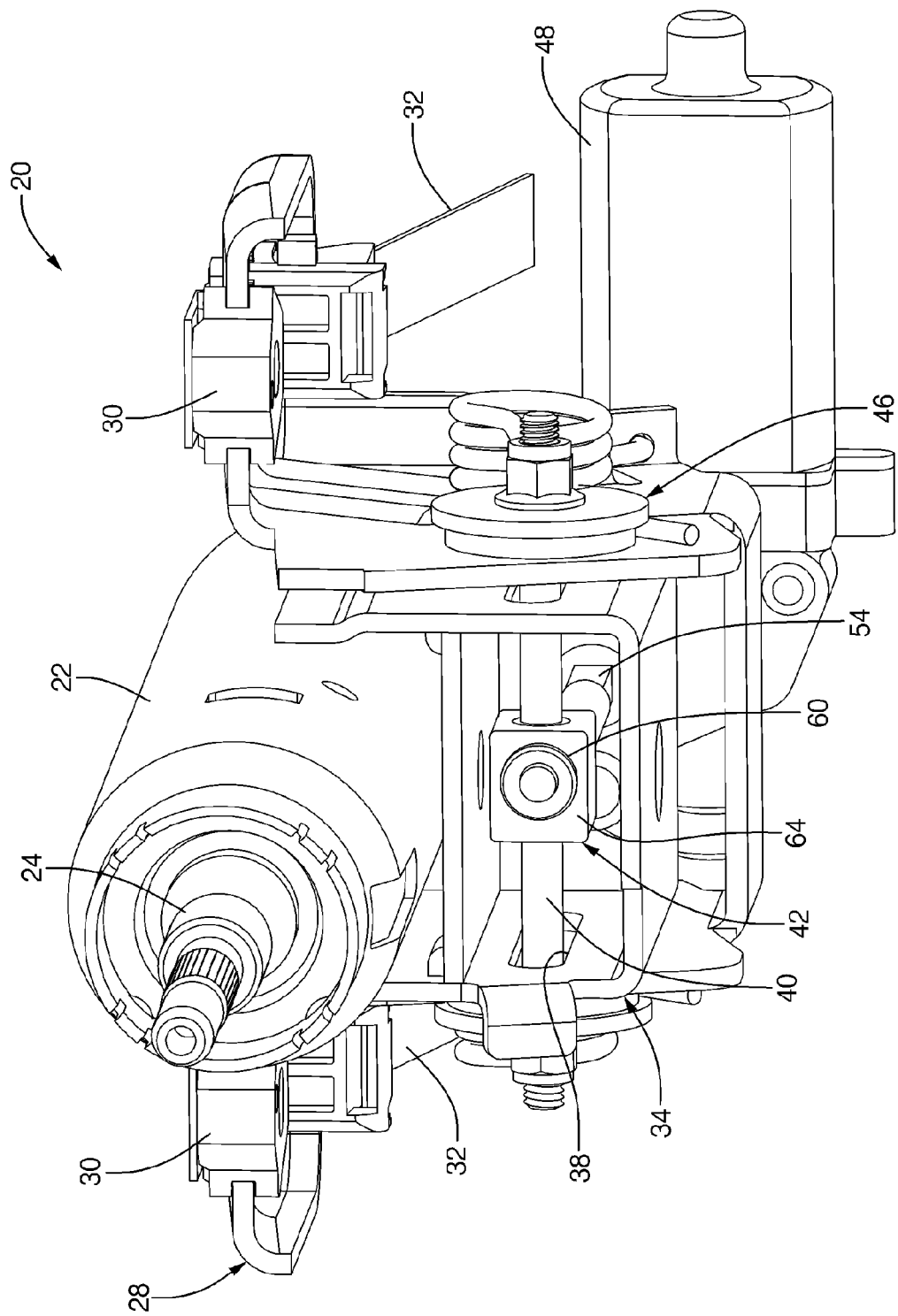
FIG. 2 is a perspective view of the steering column assembly taken from a different angle than presented in FIG. 1.

For purposes of supporting the steering column assembly 20 within the vehicle, a capsule bracket, generally indicated at 28 in FIGS. 1 and 2, is provided with means for fixed, or stationary, mounting relative to the vehicle. The capsule bracket 28 may or may not include an emergency release capsule 30 designed to disengage from the vehicle mounting structure in the event of a frontal collision. The release capsule 30 may be further designed with an energy absorbing mechanism, such as strips 32 shown in FIG. 2.

Figure 3:
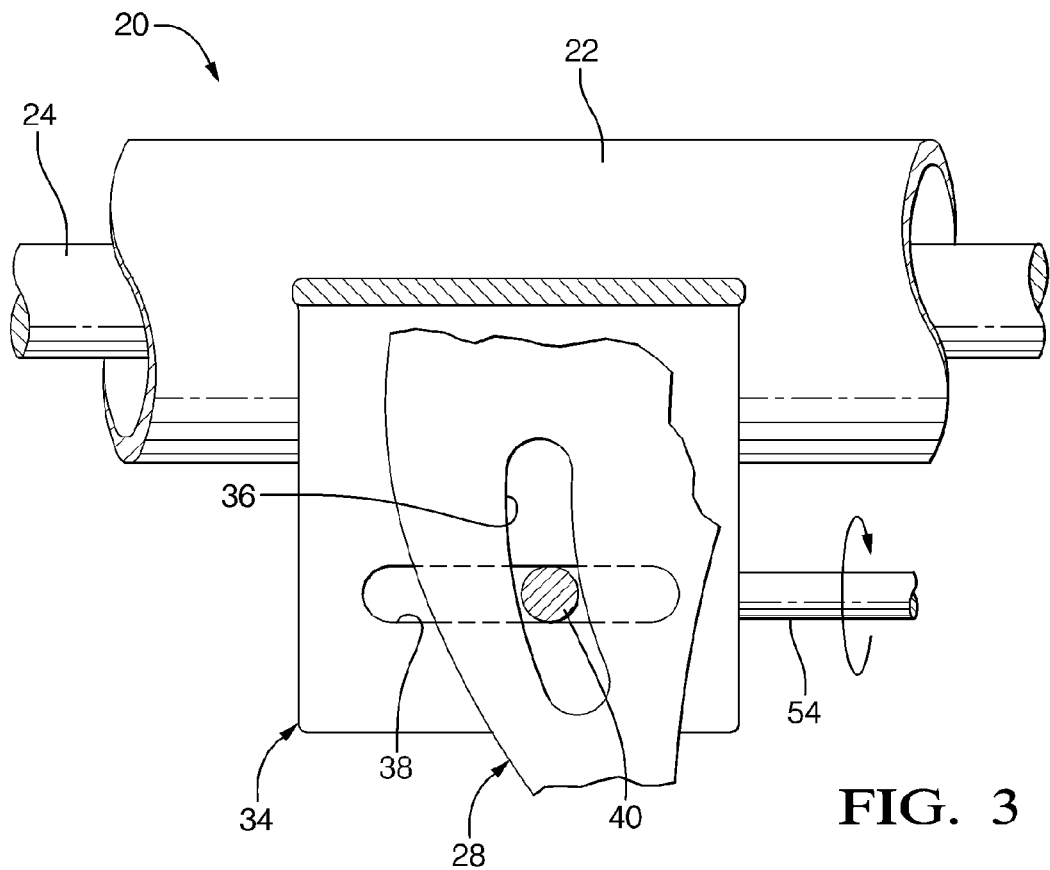
FIG. 3 is a simplified side view of the compression and capsule brackets.

A compression bracket, generally indicated at 34, is rigidly joined to the column sleeve 22, such as by welding. The compression bracket 34 is moveably carried in the capsule bracket 28 in such a manner that the column sleeve 22 is permitted to travel in arcuate (rake) and axial (reach) motions relative to the vehicle. This is accomplished in the preferred embodiment of the invention by the mechanism design illustrated in FIG. 3, where the capsule bracket 28 is shown including an elongated capsule slot 36 which has an arcuate curvature corresponding to the pivot point 25 of the rake adjust feature of the steering column assembly 20. To accommodate the telescoping function, the compression bracket 34 is provided with an elongated compression slot 38 which allows the compression bracket 34 together with the column sleeve 22 to move in and out in a telescope adjusting mode. A transverse clamp bolt 40 extends through an opening created by the overlapping intersection of the compression slot 38 and capsule slot 36. The clamp bolt 40 moves with the compression bracket 34 and column sleeve 22 during rake adjustment, however remains stationary during telescope adjust such that the compression slot 38 slides relative to the clamp bolt 40.

The clamp bolt 40 is part of a locking mechanism, generally indicated at 42, which functions to selectively lock and unlock the steering column assembly 20 for rake and telescope adjust purposes. The locking mechanism 42 is operatively disposed between the capsule bracket 28 and the compression bracket 34 and is designed so as to provide linear reversing travel between an unlocked condition in which the arcuate and axial position of the column sleeve 22 is adjustable, and a locked condition in which the column sleeve 22 is retained in an adjusted position. The locking mechanism 42 has a rotary input 44. The locking mechanism 42 also includes a clamp 46 which is responsive to the reciprocating linear movements to move its flange-like surface into pressing engagement with the capsule bracket 28 when in the locked condition. The flange of clamp 46 is located on the distal end of the clamp bolt 40.

A motor, generally indicated at 48, is, in the preferred embodiment, powered by DC electric current and mounted for movement in the rake and telescope directions together with the column sleeve 22. The motor 48 may take many forms, but as shown in the Figures includes a worm drive gear box 50 capable of producing a rotary output 52. The worm drive gear box 50 provides a high torque gear reduction and isolates feedback torsion to the shaft driven by motor 48. A drive shaft, generally indicated at 54, is supported for rotation between a first end 56 and a second end 58. The first end 56 is operatively connected to the rotary output 52 from the motor 48. As perhaps best shown in FIG. 5, the first end 56 may have a square or other sliding spline type configuration so that relative sliding motion between the motor 48 and the drive shaft 54 will not interrupt the transfer of rotary output motion therebetween. The second end 58 of the drive shaft 54 is operatively connected to the rotary input 44 of the locking mechanism 42. In this manner, rotary motion developed by the motor 48 is transmitted along the drive shaft 54 to the locking mechanism 42.

The locking mechanism 42 includes a transmission, generally indicated at 60, which is operatively disposed between the second end 58 of the drive shaft 54 and the clamp 46 for converting continuous rotary movement, i.e., non-reversing, from the rotary input 44 into reciprocating linear movements of the clamp 46. Thus, the clamp 46 is actuated from its locked to its unlocked conditions, and back to its locked condition again, without reversing the angular direction of the rotary output 52.

In the preferred embodiment, the second end 58 of the drive shaft 54 also serves as the rotary input 44 to the locking mechanism 42, however this is not mechanically necessary. Nevertheless, as shown, the second end 58 of the drive shaft 54 is supported for rotation about an axis which is not parallel to the linear reversing travel of the lock mechanism 42. In other words, the reciprocating linear movements which cause the clamp 46 to lock and unlock is skewed from the rotational axis of the second end 58 of the drive shaft 54.

Figure 4:
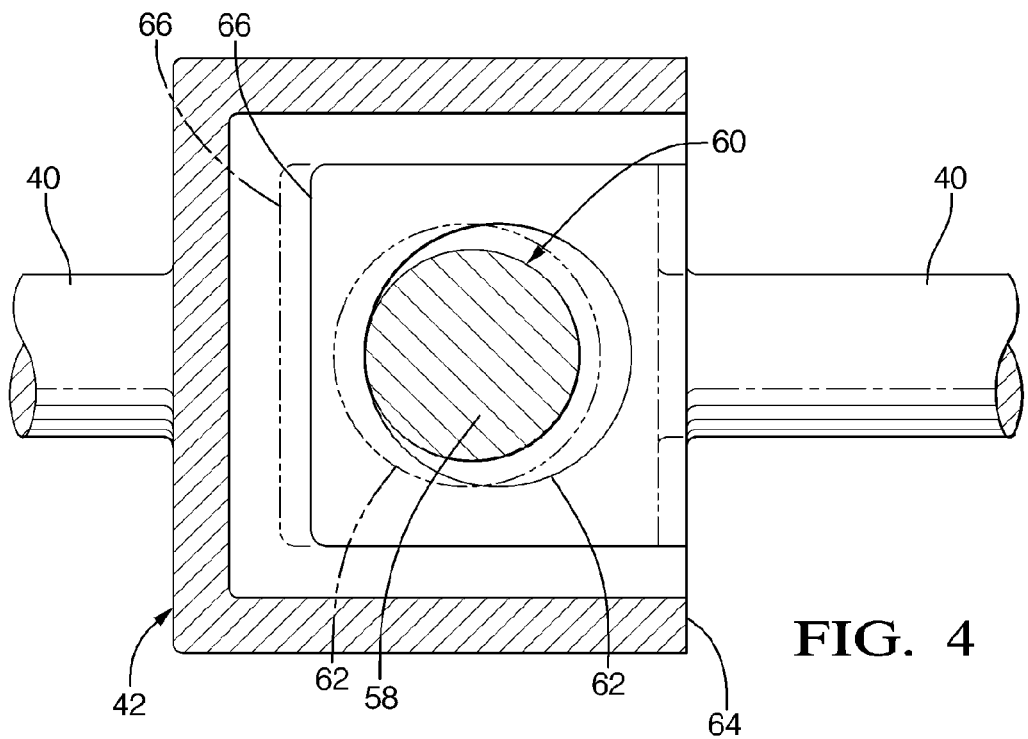
FIG. 4 is a simplified cross-sectional view showing the lock mechanism and transmission with the cam follower in an unclamped condition in solid and in a clamped condition in phantom.

In FIG. 4, a cross-sectional view of the transmission 60 shows a cam 62 which is fixed to the second end 58 of the drive shaft 54. The cam 62 rotates in journals formed in a cam housing 64. A cam follower 66 rides against the cam 62 so as to receive rotary inputs from the cam 62 and convert those rotary inputs into reciprocating linear movements. In the preferred embodiment, the cam 62 has a circular profile, offset from the rotational axis of the second end 58. The cam follower 66 comprises a circular hole corresponding in diameter to the cam 62. The cam follower 66 is formed on the end of the clamp bolt 40 and thus alternately tensions and untensions the clamp bolt 40 as the cam 62 rotates within the cam follower 66.

In the preferred embodiment, the capsule bracket 28 and compression bracket 34 have corresponding features on opposite sides of the column sleeve 22. This is perhaps best shown in FIG. 2. Accordingly, a second clamp bolt 40 extends from the cam housing 64 and actuates a complimentary clamp 46 on the opposing side of the capsule 28 and compression 34 brackets. Therefore, as the rotating cam 62 cycles between its maximum and minimum lift conditions, the opposing clamp bolts 40 are simultaneously tensioned and untensioned to stroke a linear displacement corresponding to the lift displacement feature of the cam 62. This lift displacement may result in movement of the respective clamps 46 approximately 1 millimeter between the locked and unlocked conditions. This 1 millimeter displacement, which is merely exemplary and may be different, is sufficient to apply and release clamping pressure to the capsule bracket 28 and by friction lock it and unlock it relative to the compression bracket 34. The particularly advantageous characteristic of the transmission 60 enables the motor 48 to drive in a continuous angular direction yet result in the necessary shuttling of the locking mechanism between its unlocked and locked conditions.

Figure 6:
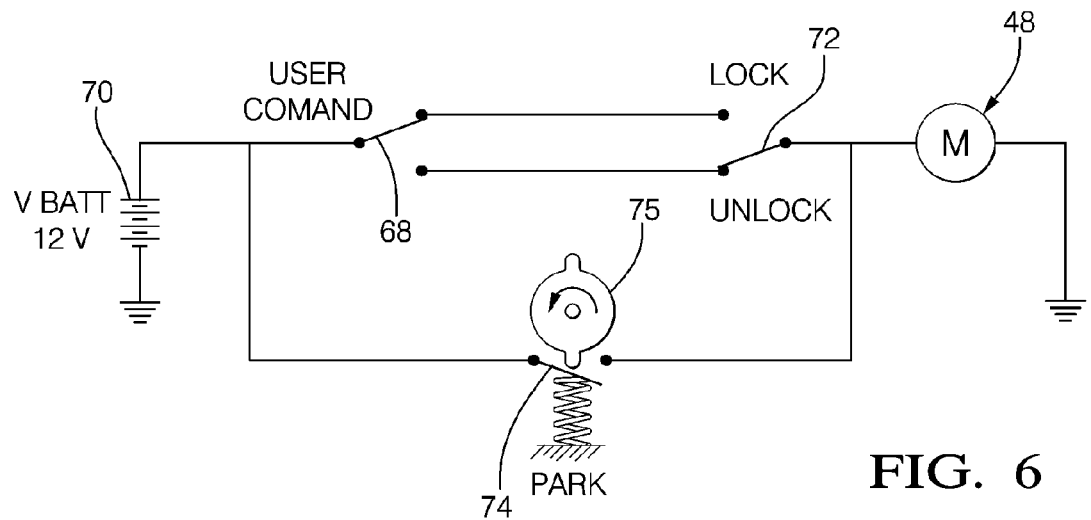
FIG. 6 is a schematic view of a control circuit diagram for the subject invention.
Figure 7:
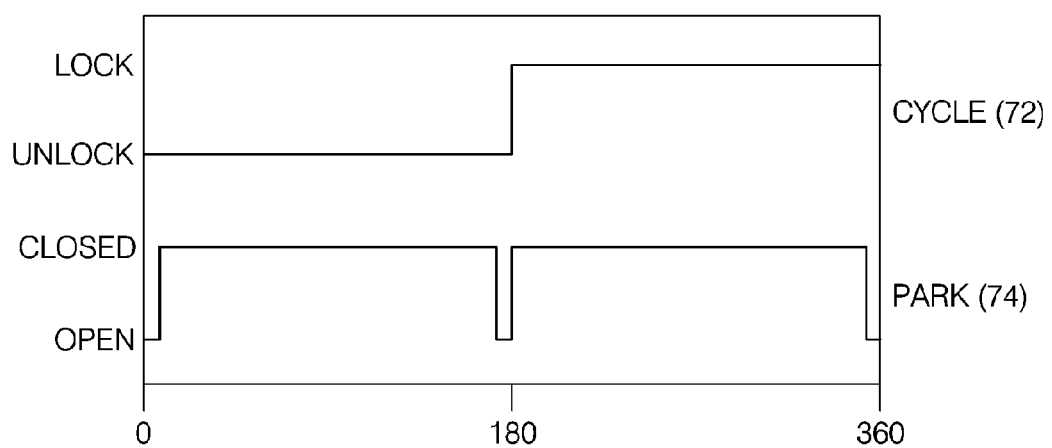
FIG. 7 is a simplified chart showing the various switch positions during one complete rotational cycle of the motor output.

Referring now to FIGS. 6 and 7, the system is shown schematically including a toggle switch 68 which would be conveniently located for a driver to actuate. The toggle switch 68 is connected in a circuit between the power source, such as the vehicle battery 70, and the motor 48. A position sensor 72 monitors the locked and unlocked conditions. The position sensor 72 can be located at the motor 48, the worm drive gear box 50, the drive shaft 54, or within the transmission 60. It can be any type of position sensor, such as of the Hall effect type, proximity type, positive contact type, or other. Its function is to cycle a switching circuit thereof between locked and unlocked conditions. The control circuit also includes a park switch 74 which functions to open the current path between the battery 70 and the motor 48 as the cam 62 reaches its maximum or minimum lift positions which, in this example, are 180° apart. For illustrative purposes only, the park switch 74 is shown in conjunction with a timing wheel 75 designed to open the park switch 74 over a very short dwell period every 180° of cam 62 rotation, corresponding to the maximum and minimum lift positions of the cam 62.

If a driver desires to adjust the rake and/or telescope of the steering wheel, he or she actuates the toggle switch 68 which immediately allows current to flow from the battery 70 to the motor 48. Rotation of the motor 48 output promptly closes the park switch 74 and almost immediately thereafter the position sensor 72 shifts its switch so that current from the battery 72 flows to the motor 48 through the closed park switch 74 only. As the cam 62 reaches the maximum or minimum lift condition 180° later, the park switch 74 automatically opens thus ending the flow of current from the battery 70 to the motor 48. The locking mechanism 48 thereby stops in its clamped or unclamped condition. If in the unclamped condition, the driver is free to adjust the rake and telescope of the steering wheel. When the desired position has been achieved, the driver actuates the toggle switch 68 once again which allows the control circuit to energize the motor 48 for another 180° cycle of rotation. This sequence may be repeated endlessly to shuttle the locking mechanism between its locked and unlocked conditions while the motor 48 ever rotates in a non-reversing direction.

Figure 5:
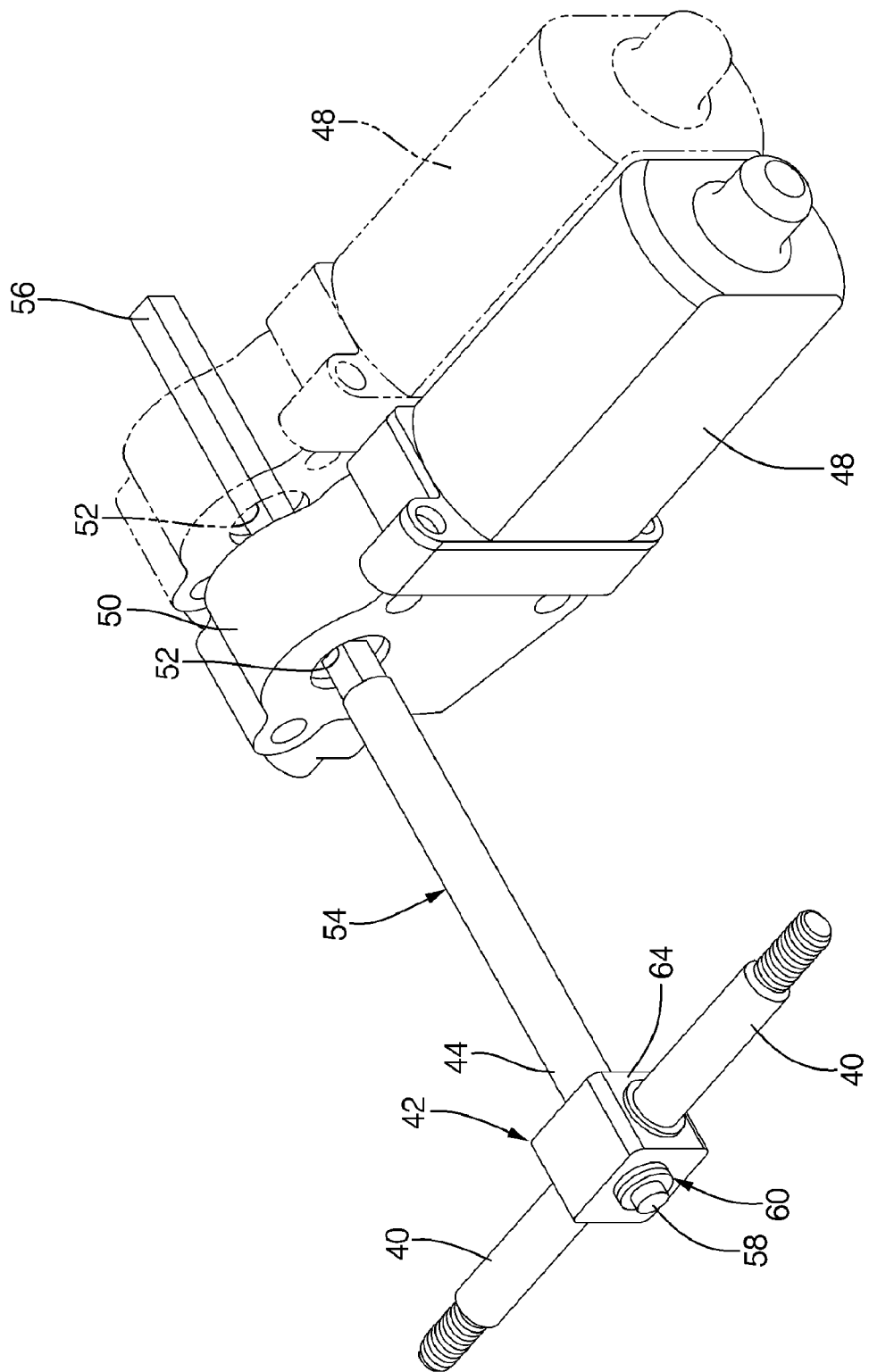
FIG. 5 is a partial perspective view showing the locking mechanism, drive shaft and motor, with the motor shown in phantom in a retracted telescoping position.

The drive shaft 54 may, as best shown in FIG. 5, comprise a rigid member whose first 56 and second 58 ends are coaxially aligned. This arrangement requires the motor 48 to be located proximate the locking mechanism 42. However, as shown in the alternative embodiment of FIG. 8, the drive shaft 54' may be constructed of a flexible material or design such that its first 56' and second 58' ends are not coaxially aligned. This convenient arrangement can permit remote location of the motor 48' without departing from the advantages of the invention as described above.

Figure 9:
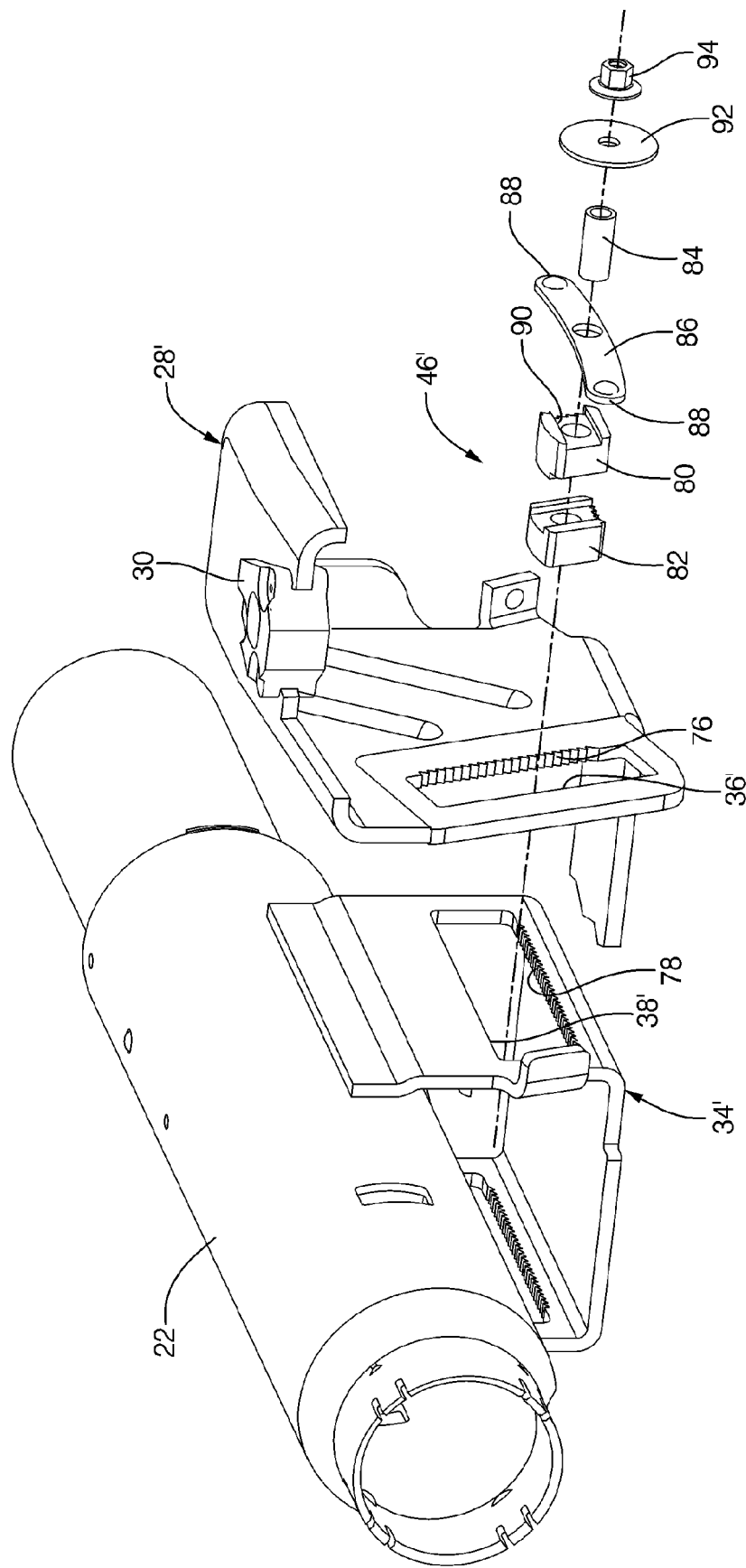
FIG. 9 is an exploded view of an alternative embodiment of the locking mechanism.
Figure 10:
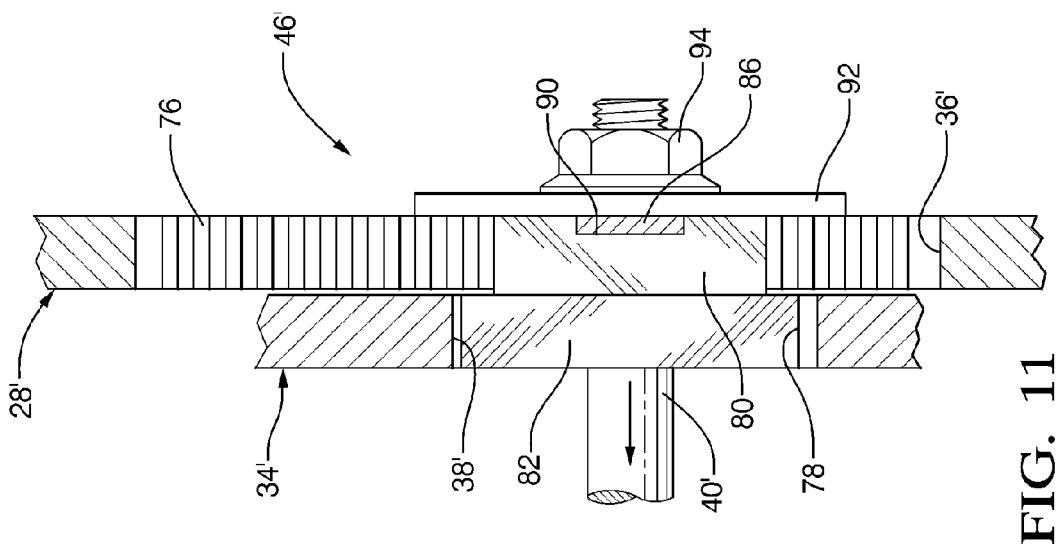
FIG. 10 is a cross-sectional view of the alternative embodiment of FIG. 9 shown in an unlocked condition.
Figure 11:
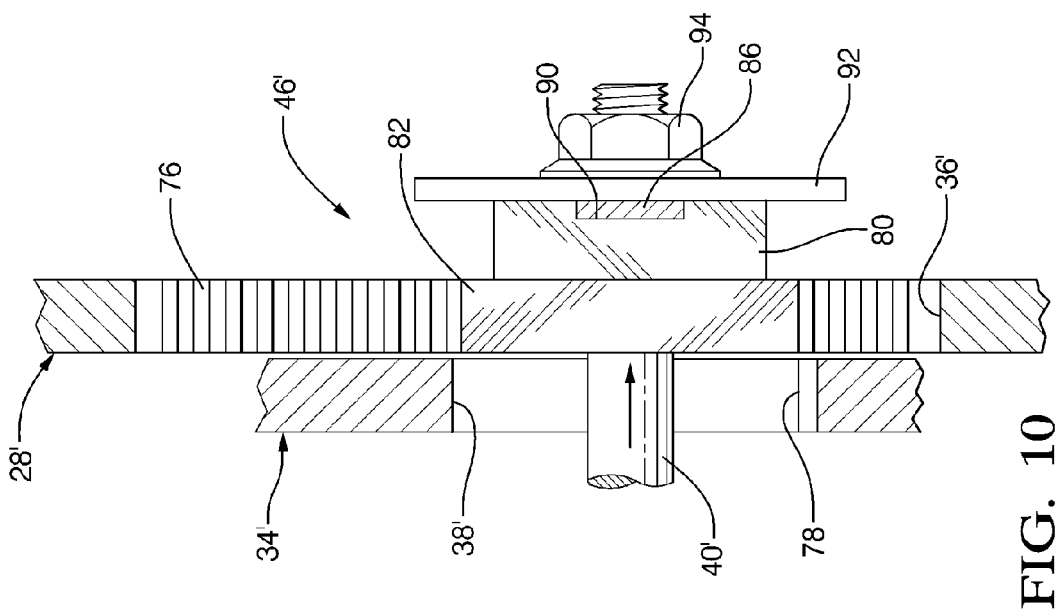
FIG. 11 is a cross-sectional view as in FIG. 10 showing the alternative locking mechanism in a locked condition.

In another alternative embodiment of the invention, shown in FIGS. 9-11, the capsule bracket slots 36' are provided with locking teeth 76 along one long edge. Similarly, the compression bracket slots 38' are also provided with associated locking teeth 78. In this embodiment, the locking mechanism 42' operates not by friction but by positive displacement. More particularly, the clamp 46' is configured to include a capsule bracket pawl 80 adapted for engagement with the locking teeth 76 of the capsule bracket slot 36'. Similarly, a compression bracket pawl 82 engages the locking teeth 78 in the compression bracket slot 38'. A partial exploded view of this alternative clamping configuration is shown in FIG. 9 with half of the capsule bracket assembly 28' and half of the compression bracket assembly 34'. The pawls 80, 82 are carried on a common tube rivet 84, together with a centering spring 86. The centering spring is of the leaf spring variety having bowed free ends 88 which press against opposite sides of the capsule bracket slot 36', thus urging the combined pawls 80, 82 and tube rivet 84 toward an unlocked condition. The capsule bracket pawl 80 is formed with a generally horizontal groove 90 adapted to seat the centering spring 86, as perhaps best shown in FIGS. 10 and 11. For economy, both pawls 80, 82 can be made identical in shape and size, such that a corresponding groove 90 on the compression bracket pawl 82 is present but superfluous. If this economical approach is adopted, the width of the compression bracket pawl 82 must slide with clearance within the capsule bracket slot 36' during rake adjustment operations, as shown in FIG. 10. A washer 92 backs-up the capsule bracket pawl 80 and bears against capsule bracket 28' in the locked condition to add rigidity to the column assembly 20'. A nut 94 is threaded onto the distal end of the clamp bolt 40', adjacent the washer 92.

In the unlocked condition (FIG. 10), the capsule 80 and compression 82 bracket pawls are pushed laterally out of engagement with their respective teeth, so that the steering column assembly 20' can be adjusted for rake and reach. However, when the locking mechanism 42' is moved to its locked condition (FIG. 11), the clamp bolts 40' draw the pawls 80, 82 into their respective slots 36', 38', thereby engaging their respective locking teeth 76, 78 and fixing the column assembly 20' in its adjusted position. Those skilled in the art will appreciate that other positive lock configurations than those shown in FIGS. 9-11 can be used without departing from the scope of this invention.

The invention also contemplates a method for adjusting the rake and telescope of the steering column assembly 20 by first affixing a compression bracket 34 to the steering column 20, then supporting the compression bracket 34 upon a capsule bracket 28 to allow arcuate and axial motion of the steering column 20 relative to the vehicle. Rake and telescope adjustment is accomplished by shuttling a locking mechanism 42 between an unlocked condition in which the compression bracket 34 is moveable relative to the capsule bracket 28, and a locked condition in which the compression bracket 34 is fixed relative to the capsule bracket 28, and back to the unlocked condition again. This step of shuttling the locking mechanism includes the advantageous step of rotating a motor output 52 in a non-reversing angular direction. Thus, the locking mechanism is shuttled from unlocked to locked and back to an unlocked condition again without reversing the rotational direction of the motor 48.

Figure 8:
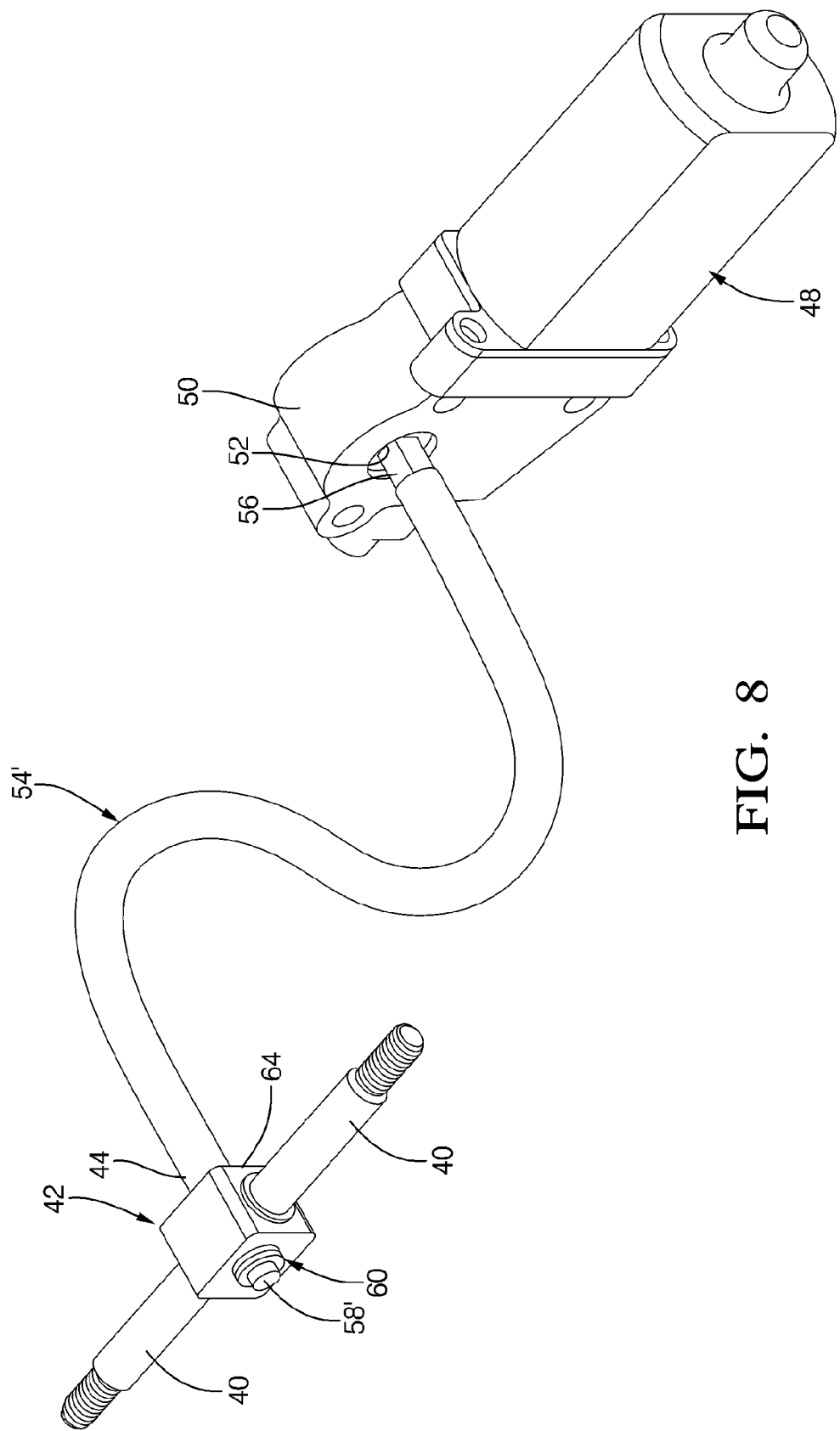
FIG. 8 is a simplified perspective view showing an alternative flexible drive shaft.

The step of rotating the drive shaft can include rotating it about either a linear axis of rotation (FIG. 5) or about a non-linear axis of rotation (FIG. 8). The non-linear axis of rotation contemplates a flexible drive shaft 54' to accommodate remote location of the motor 48.

The step of shuttling the locking mechanism 42 further includes the step of placing a clamp bolt 40 in tension. The tension is released as the locking mechanism is returned to its unlocked condition. By compressing the capsule bracket 28 into pressing relation against the compression bracket 34, an adjusted position can be maintained for driver convenience and safety purposes. Alternatively, shuttling the locking mechanism 42 can include moving one or more pawls 80, 82 into engagement with corresponding teeth 76, 78 in the respective capsule 28' and compression 34' brackets, as shown in FIGS. 10 and 11. This advantageous shuttling movement is accomplished by rotating a cam 62 against a cam follower 66 so as to convert the rotary output motion from the motor 48 and drive shaft 54 into reciprocating linear movements to alternately tension and untension the clamp bolts 40.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly for a motor vehicle having an adjustable rake and telescope, said assembly comprising:
    a column sleeve;
    a capsule bracket for fixed mounting relative to the vehicle;
    a compression bracket joined to said sleeve and moveably carried upon said capsule bracket for allowing arcuate and axial motion of said sleeve relative to the vehicle;
    a motor having a rotary output, said rotary output having non-reversing rotary motion;
    a locking mechanism having a rotary input and operatively disposed between said capsule bracket and said compression bracket,
        said locking mechanism having a linear reversing travel between an unlocked condition, in which the arcuate and axial position of said sleeve is adjustable, and a locked condition, in which said sleeve is retained in an adjusted position,
        said locking mechanism comprising a transmission operatively engaging said rotary input such that, through said transmission, said locking mechanism has reciprocating linear movement between said unlocked and locked conditions, and such that, by said transmission, non-reversing rotary movement of said rotary input in a continuous angular direction is converted into reciprocating linear movement, thereby actuating said locking mechanism from said locked condition to said unlocked condition and from said unlocked condition to said locked condition, all while said rotary output from said motor has said non-reversing rotary motion; and
    a drive shaft rotatably supported between a first end operatively connected to said rotary output of said motor and a second end operatively connected to said rotary input of said locking mechanism, said non-reversing rotary motion transmitted through said drive shaft from said motor to said locking mechanism.

2. The assembly of claim 1, wherein said second end of said drive shaft is supported for rotation about an axis non-parallel to said linear reversing travel of said lock mechanism.

3. The assembly of claim 1, wherein said first and second ends of said drive shaft are not co-axially aligned.

4. The assembly of claim 3, wherein said drive shaft is flexible.

5. The assembly of claim 1, wherein said first and second ends of said drive shaft are co-axially aligned.

6. The assembly of claim 1, wherein said locking mechanism includes a clamp responsive to reciprocating linear inputs for moving between said locked and unlocked conditions.

7. The assembly of claim 6, wherein said transmission is operatively disposed between said second end of said drive shaft and said clamp.

8. The assembly of claim 7, wherein said locking mechanism includes a cam supported on said second end of said drive shaft.

9. The assembly of claim 8, wherein said locking mechanism includes a cam follower operatively engaging said cam.

10. The assembly of claim 9, wherein said locking mechanism includes a clamp bolt connected at one end thereof to said cam follower and at another end thereof to said clamp.

11. The assembly as set forth in claim 7, wherein said clamp includes a flange in pressing engagement with said capsule bracket when in said locked condition.

12. The assembly as set forth in claim 7, wherein said capsule bracket includes an elongated slot through which said clamp bolt extends.

13. The assembly as set forth in claim 12, wherein said compression bracket includes an elongated slot through which said clamp bolt extends.

14. The assembly as set forth in claim 13, wherein said capsule bracket slot includes associated locking teeth.

15. The assembly as set forth in claim 14, wherein said compression bracket slot includes associated locking teeth.

16. The assembly as set forth in claim 15, wherein said clamp includes a capsule pawl adapted for engagement with said teeth of said capsule bracket slot.

17. The assembly as set forth in claim 16, wherein said clamp includes a compression pawl adapted for engagement with said teeth of said compression bracket slot.

18. The assembly of claim 1:
    said locking mechanism comprising at least one clamp bolt, wherein application of a tensile force in the at least one clamp bolt corresponds to either said locked condition or said unlocked condition, and wherein application of a compressive force in the at least one clamp bolt corresponds to the other of said locked condition or said unlocked condition; and
    said transmission comprising a cam and a cam follower, the cam being operatively engaged with said second end of said drive shaft for non-reversing rotary motion with said drive shaft, the cam follower riding against the cam and being engaged to the clamp bolt for creating a tensile force in the clamp bolt during a first portion of the rotary motion of the cam and for creating a compressive force in the clamp bolt during a second portion of the rotary motion of the cam.

19. The assembly of claim 1, the cam follower being constrained for linear movement along a longitudinal axis of the clamp bolt.

20. The assembly of claim 1, the cam being disposed within the cam follower.

21. The assembly of claim 1, wherein the cam has a circular profile offset from a rotational axis of the drive shaft.

22. The assembly of claim 1, wherein the cam follower comprises a circular hole formed in the clamp bolt.

23. A locking assembly for an adjustable rake and telescope steering column, said locking assembly comprising:
 a rotary input;
 a clamp responsive to reciprocating linear inputs for moving from a locked condition to an unlocked condition and from said unlocked conditions to said locked condition;
 a motor having a non-reversing rotary output;
 a drive shaft rotatably supported between a first end operatively connected to said non-reversing rotary output of said motor and a second end operatively connected to said rotary input for transmitting the non-reversing rotary motion therebetween; and
 a transmission disposed between said rotary input and said clamp for converting the non-reversing rotary movement in a continuous angular direction from said rotary input into reciprocating linear movement, whereby said clamp is actuated from said locked condition to said unlocked condition and back to said locked condition without reversing the angular direction of said rotary output.

24. A method for adjusting the rake and telescope of a steering column assembly for a motor vehicle, said method comprising the steps of:
 affixing a compression bracket to the steering column;
 supporting the compression bracket upon a capsule bracket to allow arcuate and axial motion of the steering column relative to the vehicle; and
 shuttling a locking mechanism from an unlocked condition, in which the compression bracket is moveable relative to the capsule bracket, to a locked condition, in which the compression bracket is fixed relative to the capsule bracket, and back to the unlocked condition, said locking mechanism comprising a transmission;
 operatively engaging a rotary input by said transmission, said locking mechanism having reciprocating linear movement between said locked and unlocked conditions;
 converting rotary movement of said rotary input from a continuous angular direction into reciprocating linear movement by said transmission, said rotary movement in a continuous angular direction corresponding to both movement of the compression bracket from the locked condition to the unlocked condition and movement of the compression bracket from the unlocked condition to the locked condition;
 wherein said step of shuttling the locking mechanism includes the steps of rotating a drive shaft in a non-reversing angular direction and compressing the capsule bracket into pressing relation against the compression bracket.

25. A steering column assembly for a motor vehicle having an adjustable rake and telescope, said assembly comprising:
 a column sleeve;
 a capsule bracket for fixed mounting relative to the vehicle;
 a compression bracket joined to said sleeve and moveably carried upon said capsule bracket for allowing arcuate and axial motion of said sleeve relative to the vehicle;
 a motor having a rotary output, said rotary output having non-reversing rotary motion;
 a locking mechanism having a rotary input and operatively disposed between said capsule bracket and said compression bracket,
  said locking mechanism having a linear reversing travel between an unlocked condition, in which the arcuate and axial position of said sleeve is adjustable, and a locked condition, in which said sleeve is retained in an adjusted position,
  said locking mechanism comprising a transmission operatively engaging said rotary input, through which transmission, said locking mechanism has reciprocating linear movement between said unlocked and locked conditions, and by said transmission, rotary movement of said rotary input, in a continuous angular direction, is converted into reciprocating linear movement, thereby actuating said locking mechanism from said locked condition to said unlocked condition and back to said locked condition without reversing the angular direction of said rotary output from said motor;
 a drive shaft rotatably supported between a first end operatively connected to said rotary output of said motor and a second end operatively connected to said rotary input of said locking mechanism, rotary motion transmitted through said drive shaft from said motor to said locking mechanism; and
 a cam included with said locking mechanism and supported on said second end of said drive shaft.

* * * * *